Sept. 4, 1934.  W. E. BECK  1,972,699
MACHINE FOR MAKING BOX PARTITIONS
Filed March 30, 1932   10 Sheets-Sheet 10
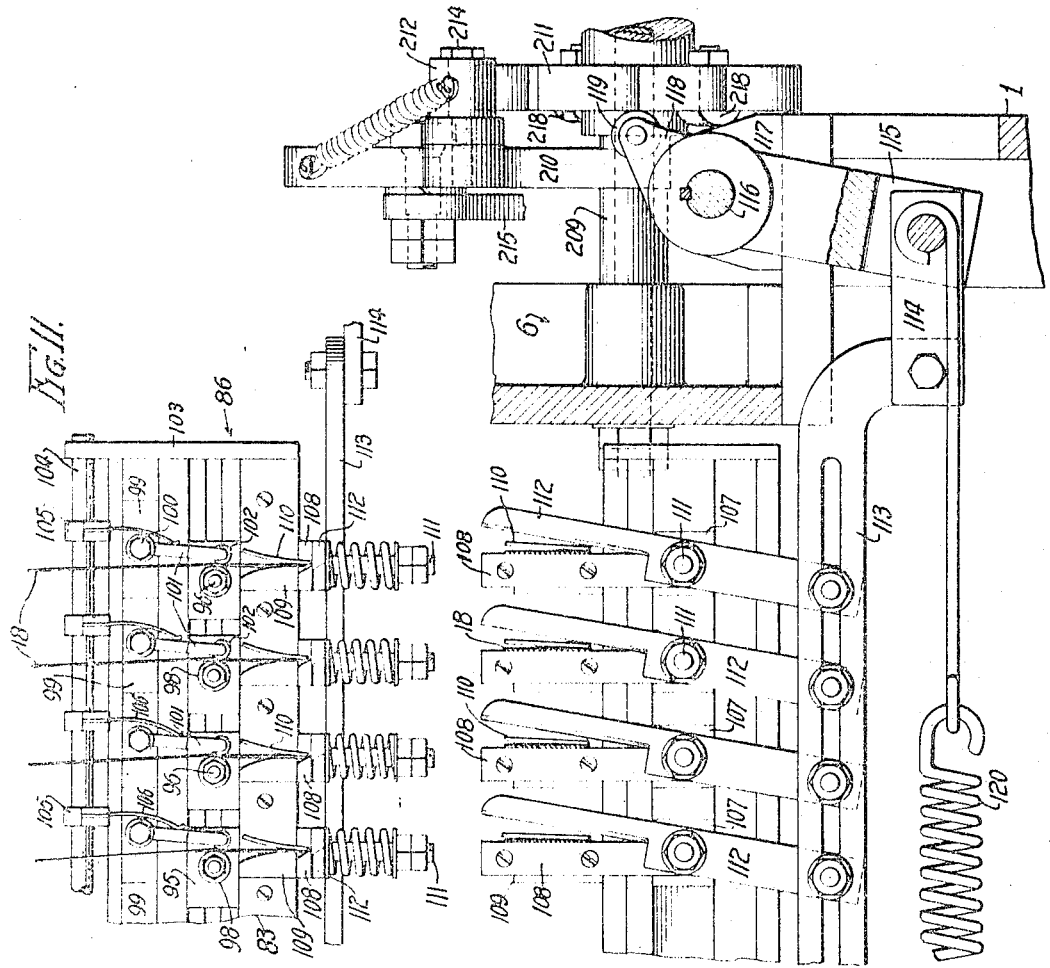
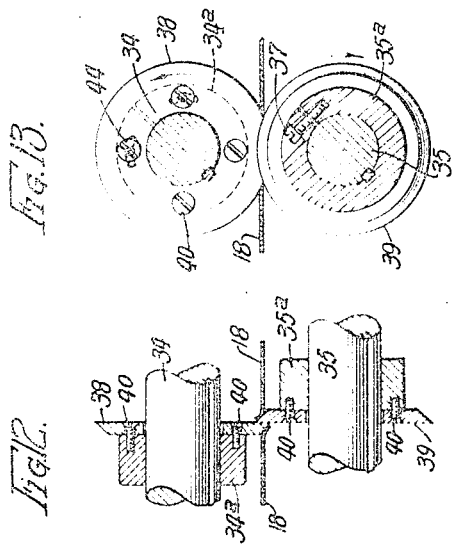
Inventor:
William E. Beck,
By: Arthur Wm Wilson
Atty.

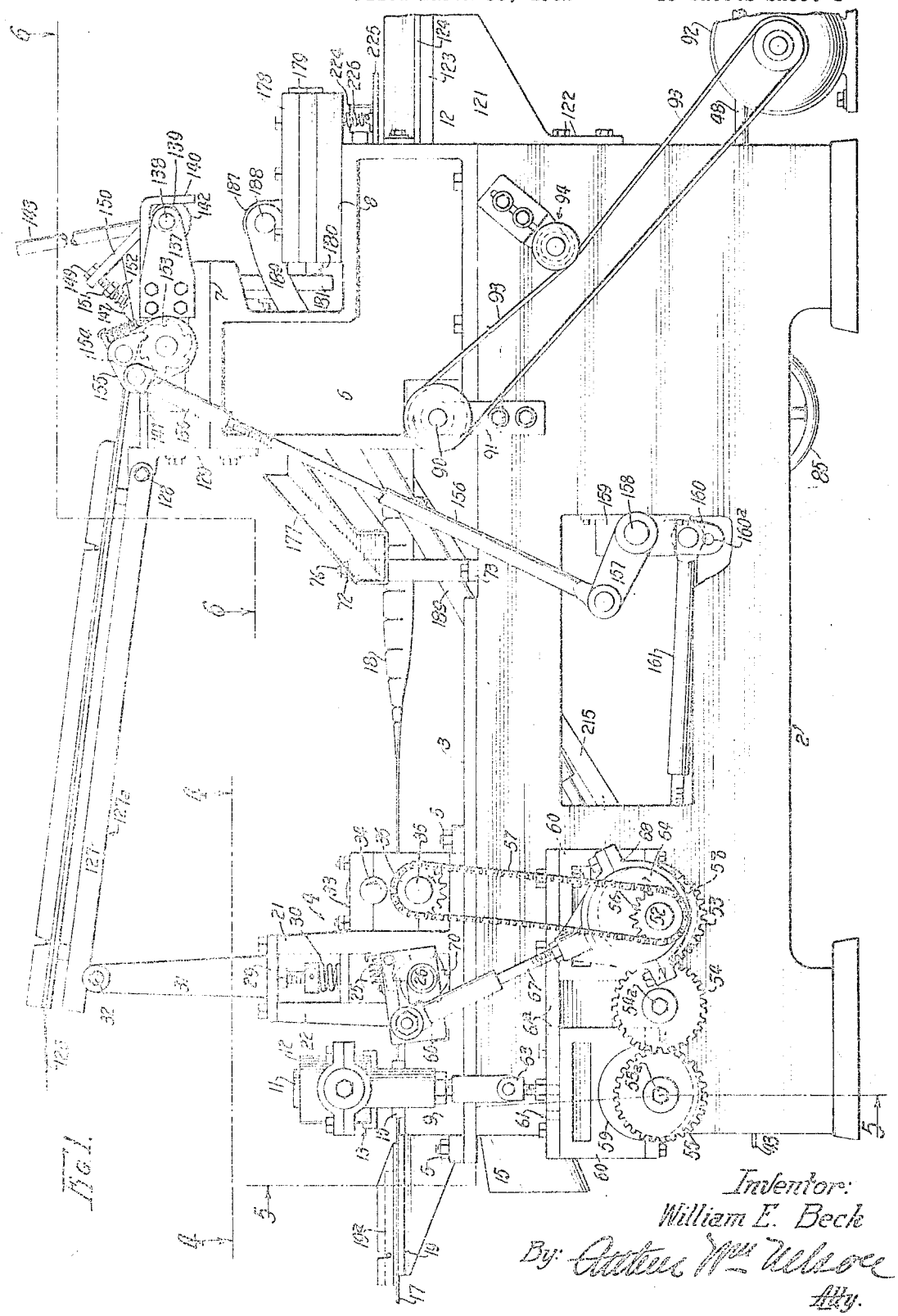

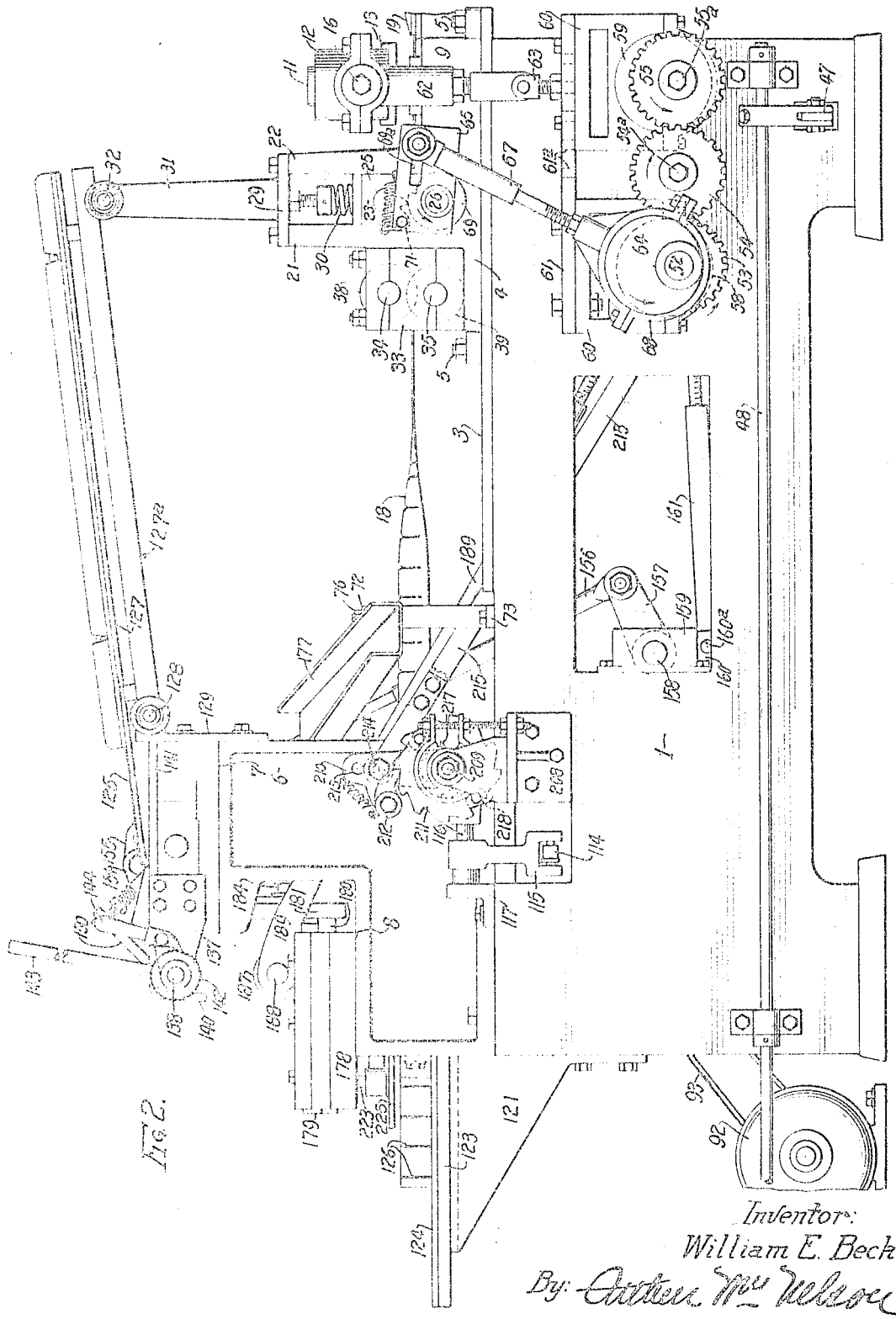

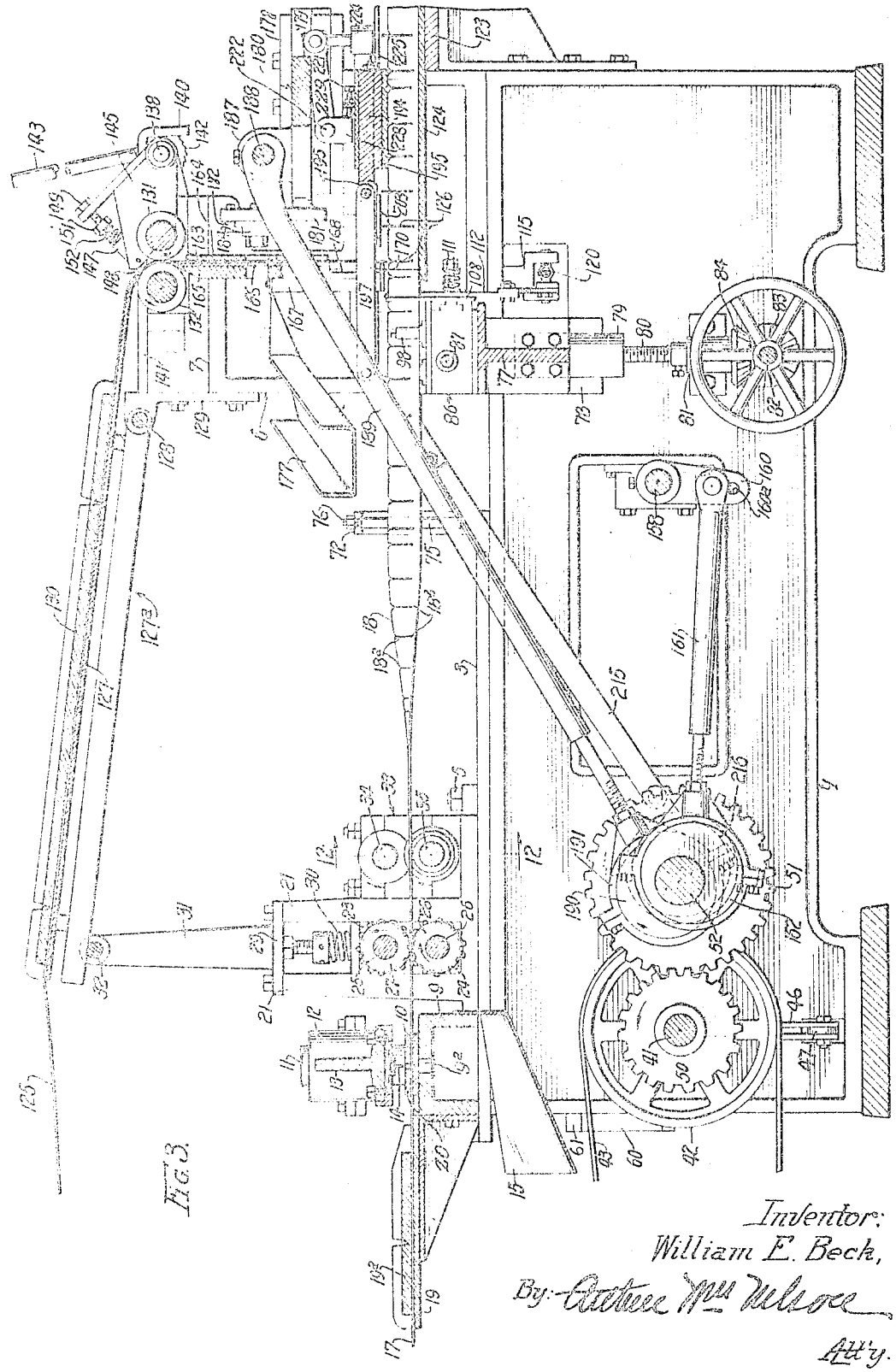

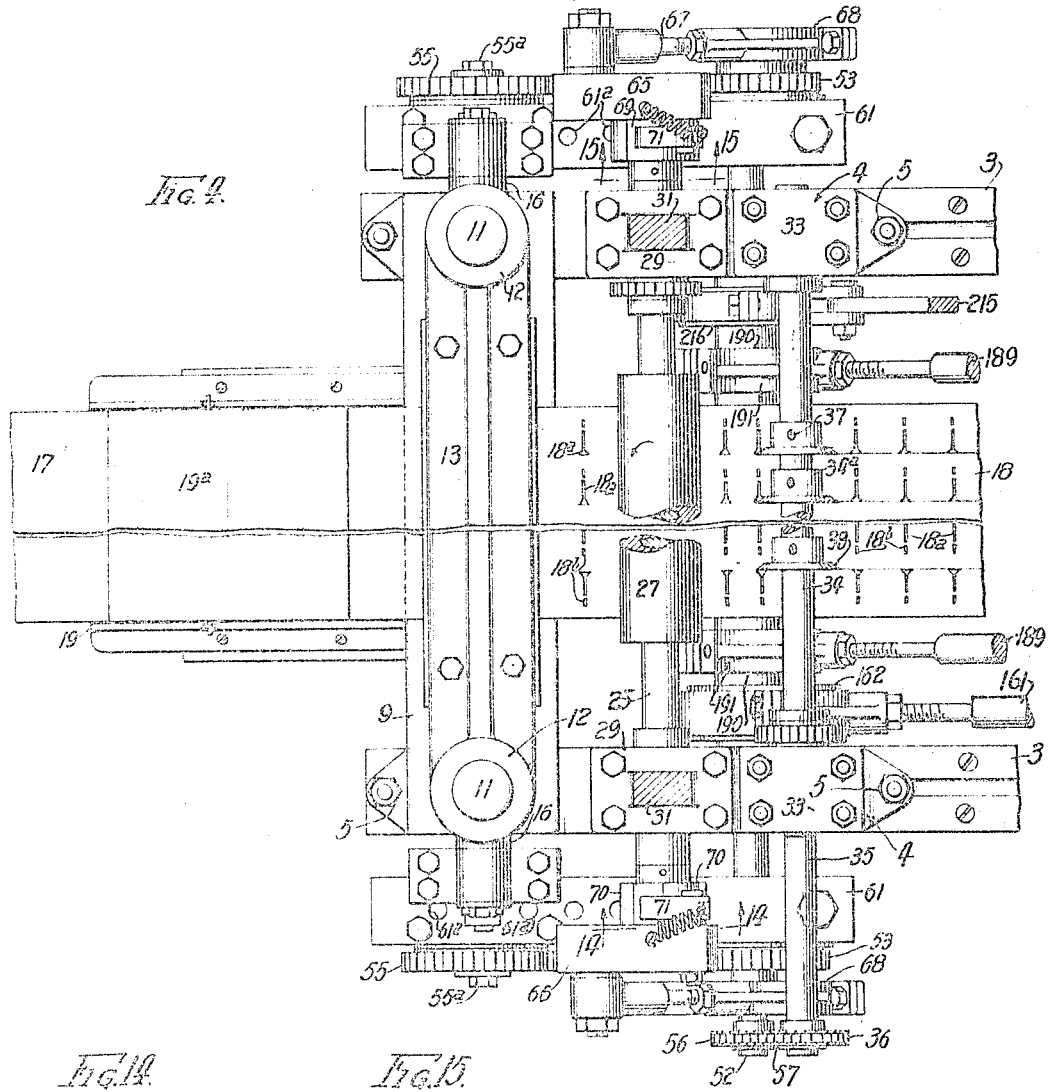
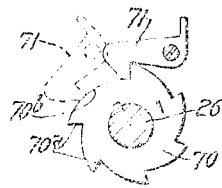
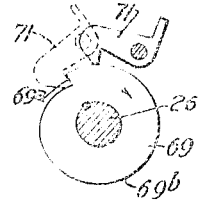
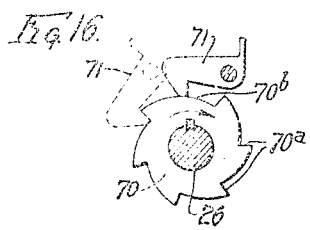
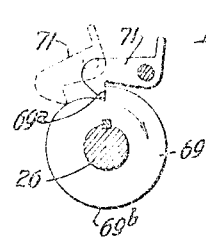

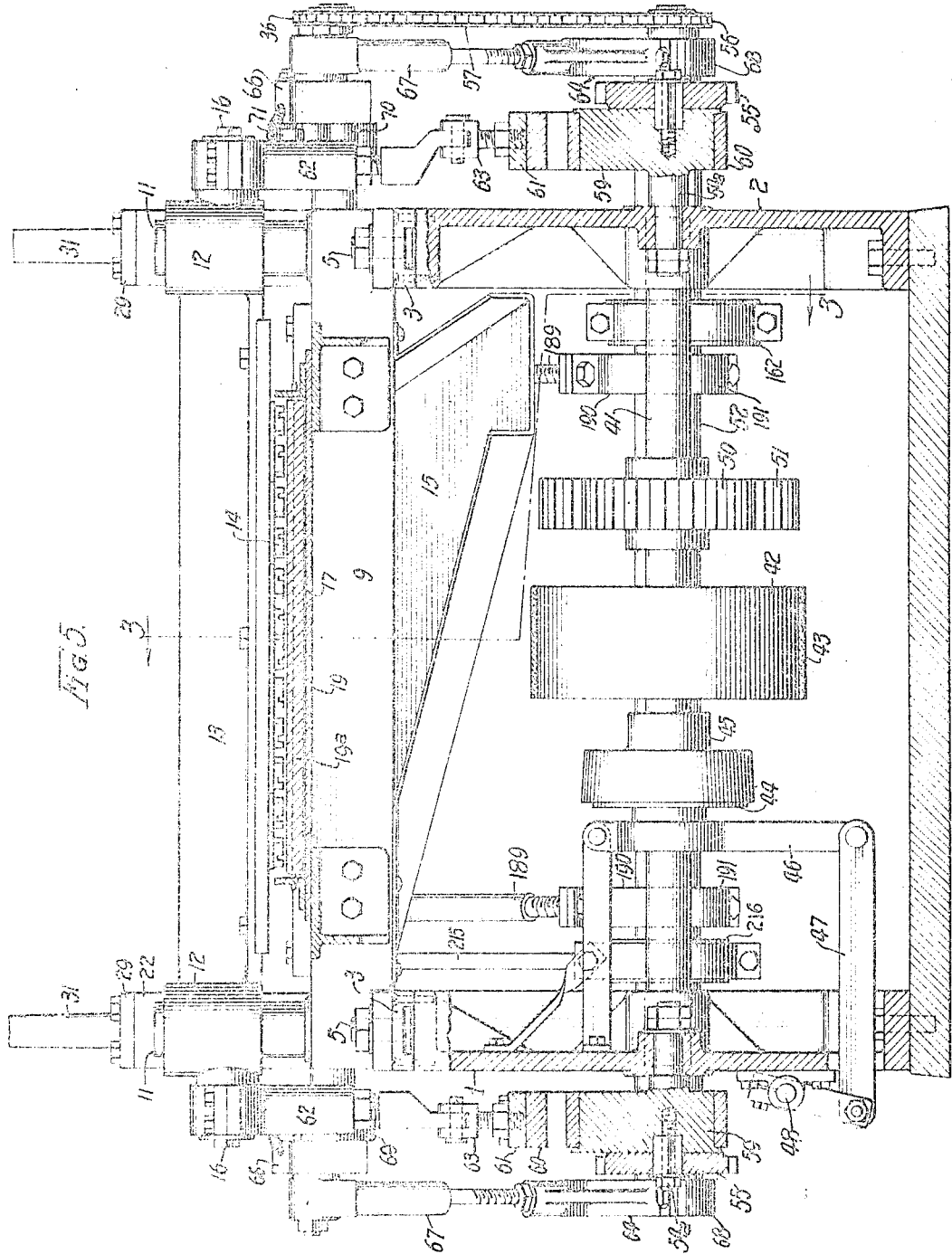

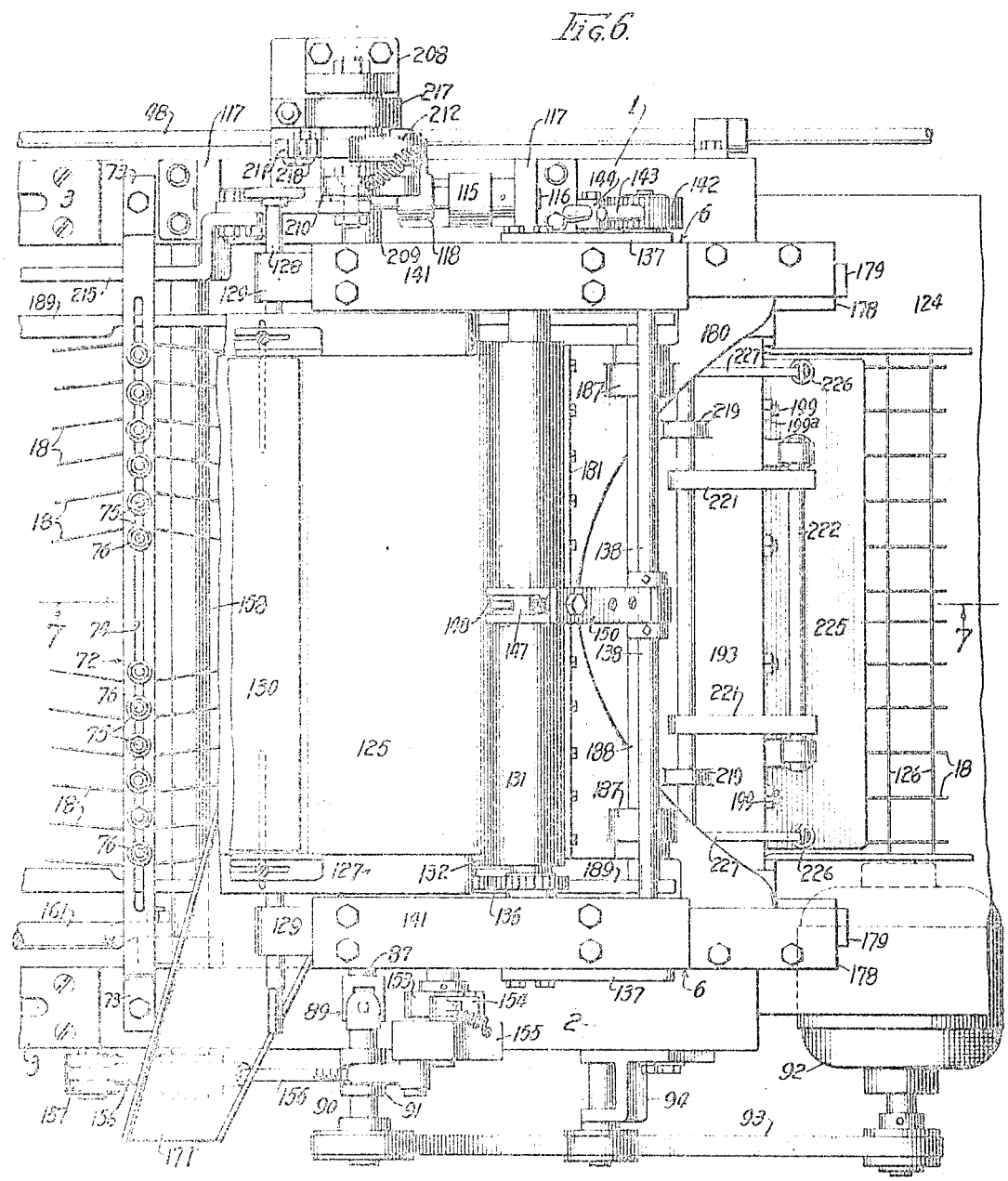

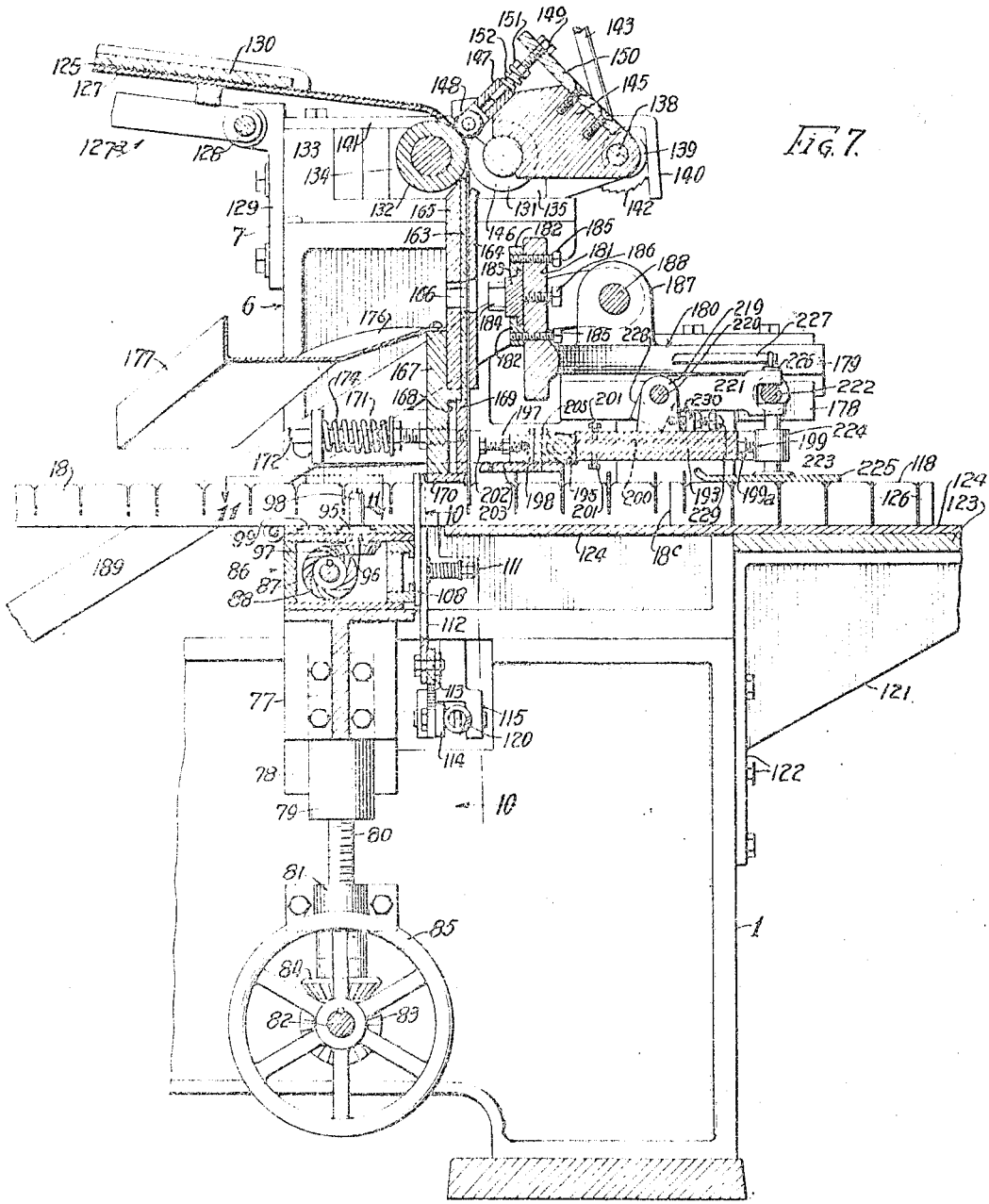

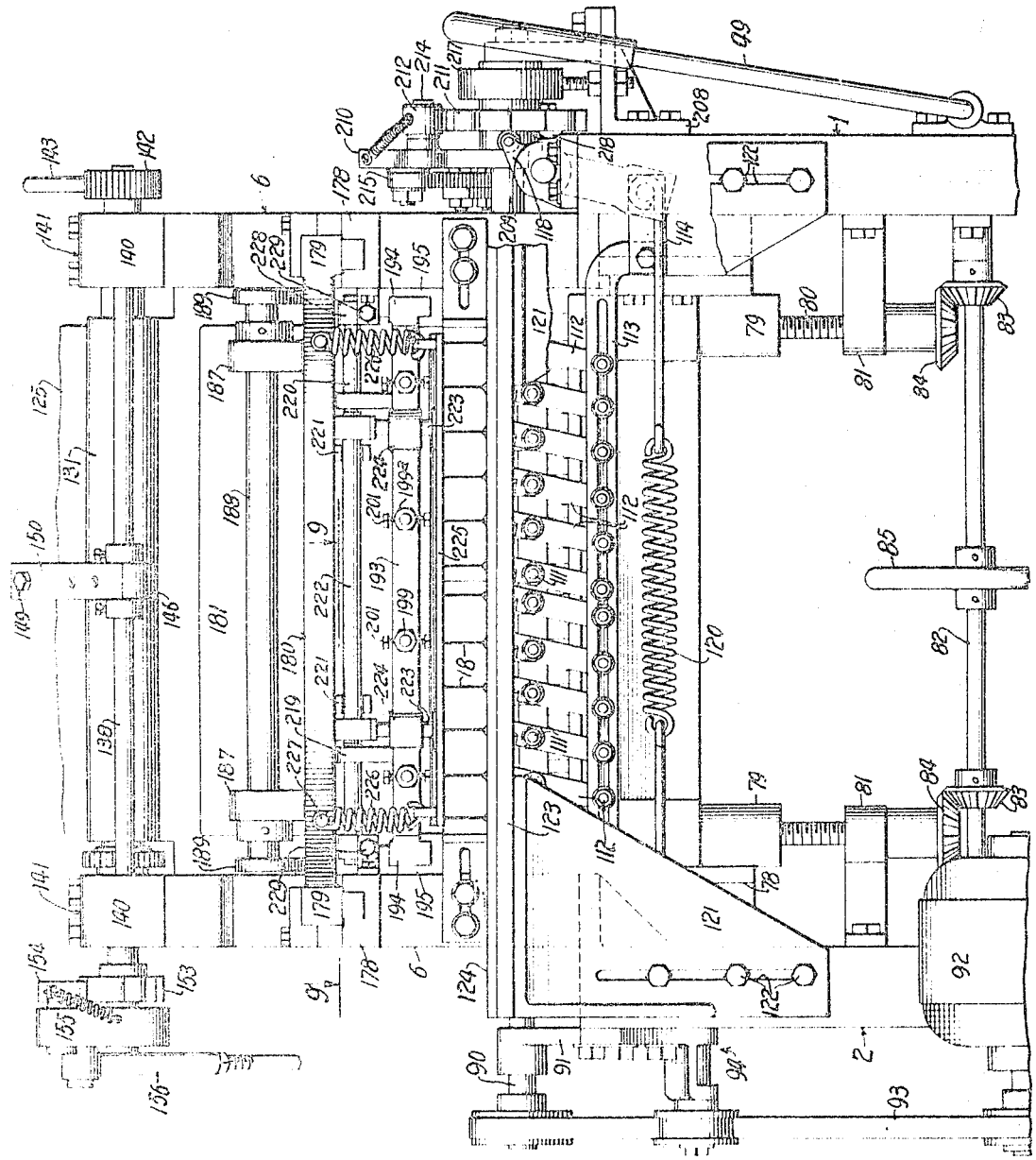

Patented Sept. 4, 1934

1,972,699

UNITED STATES PATENT OFFICE 1,972,699

MACHINE FOR MAKING BOX PARTITIONS

William E. Beck, Chicago, Ill., assignor to Traver Paper & Manufacturing Co., Chicago, Ill., a corporation of Illinois Application March 30, 1932, Serial No. 601,998

41 Claims. (Cl. 93—37)

This invention relates to improvements in machines for making box partitions, and it consists of the matters hereinafter described and more particularly pointed out in the appended claims.

The machine with which the present invention is more particularly concerned is of the type shown in my prior Patent #1,710,467, granted April 23, 1929. In the machine of said patent, two relative wide webs of paper are operated upon by associated gangs of punches in connection with certain dies to form openings in the respective webs, as said webs are fed forwardly step by step. One of said webs is then slit into longitudinal ribbons or strips which are then turned into a vertically edgewise position, after which the end margin of the other web is brought into edgewise interlocking engagement with said strips and is then severed transversely to form one of the cross strips, there being one of such cross strips formed and applied to the longitudinal strips in each step of its forward movement. When a sufficient number of cross strips has been applied to said longitudinal strips, then said last mentioned strips are severed transversely to provide a finished collapsible partition, ready for use in its intended purpose.

The primary object of the invention is to provide a machine of this kind, which is more simple in construction, can be run at a greater speed and which is universally adjustable to make partitions of this kind of different dimensions as to length, width and height as well as to the different dimensions in the lateral spacing of the longitudinal and cross strips.

Another object of the invention is to so arrange the punches and dies for the web from which the longitudinal strips are made, with respect to the associated feed rolls and slitters that said rolls act upon the web which is better able to withstand the feeding pull instead of upon the strips as heretofore and which strips being much narrower and weaker than the web, often broke with a resulting loss in both time and material.

A further object of the invention is to so mount the punch and die mechanism for the longitudinal strips, that they may be adjustable longitudinally of the machine into positions corresponding to units of length of the different partitions to be made and at the same time provide means for driving the various mechanism from a nonadjustable driving shaft.

Still another object of the invention is to provide in a machine of this kind, simple and efficient means for deflecting the longitudinal strips into a vertically edgewise position and for properly spacing them apart in accordance with their positions in the partition to be made.

Still a further object of the invention is to provide an improved pawl and ratchet mechanism for the feed rolls for the longitudinal strips, which permits of a variable step by step feed therefor to give the longer spacings required between the transverse strips for each partition unit and the shorter spacings between such units.

A further object of the invention is to provide an improved cut off mechanism for that web from which the cross strips of the partition are formed and which includes a yieldable plate associated with a stationary or fixed cutting blade of the mechanism with which the movable cutting blade cooperates in cutting the web from both sides toward the center.

Still a further object of the invention is to provide automatic means for tamping the cross strips into interlocking engagement with the longitudinal strips to bring the top edges of both sets of strips into the same plane.

The above mentioned objects of the invention, as well as others, together with the many advantages thereof, will more fully appear as I proceed with my specification.

In the drawings:—

Fig. 1 is a view in elevation of the left hand side of my improved machine for making box partitions.

Fig. 2 is a view in elevation of the right hand side thereof.

Fig. 3 is a longitudinal vertical sectional view through the improved machine as taken on the line 3—3 of Fig. 5.

Fig. 4 is a longitudinal horizontal sectional view through that part of the machine shown at the left hand end of Fig. 1 and as indicated by the line 4—4 on said Fig. 1.

Fig. 5 is a transverse vertical sectional view on an enlarged scale, through a part of the rear end of the machine as taken on the line 5—5 of Fig. 1.

Fig. 6 is a top plan view of those parts of the machine at the front end thereof as indicated by the section line 6—6 of Fig. 1.

Fig. 7 is a detail vertical sectional view through the front end of the machine as taken on the line 7—7 of Fig. 6.

Fig. 8 is a view in elevation of the front end of the machine.

Fig. 10 is a detail vertical sectional view on an enlarged scale as taken on the line 10—10 of Fig. 7.

Fig. 11 is a detail horizontal sectional view on the scale of Fig. 10 through a part of the machine as taken on the line 11—11 of Fig. 7.

Fig. 12 is a detail longitudinal vertical sectional view through a part of a pair of coacting slitting knives employed in the improved machine as taken on the line 12—12 of Fig. 3.

Fig. 13 is a view in end elevation of the parts shown in Fig. 12.

Fig. 14 is a detail vertical sectional view through a part of the machine as taken on the line 14—14 of Fig. 4 and illustrates a certain pawl and ratchet associated with one end of a certain feed roll mechanism embodied in the machine.

Fig. 15 is a detail vertical sectional view through a part of the machine as taken on the line 15—15 of Fig. 4 and illustrates another pawl and ratchet associated with the other end of said feed roll mechanism.

Fig. 16 is a view similar to Fig. 14 with the parts in a changed relation.

Fig. 17 is a view similar to Fig. 15 with the parts in a changed relation.

Figure 9:
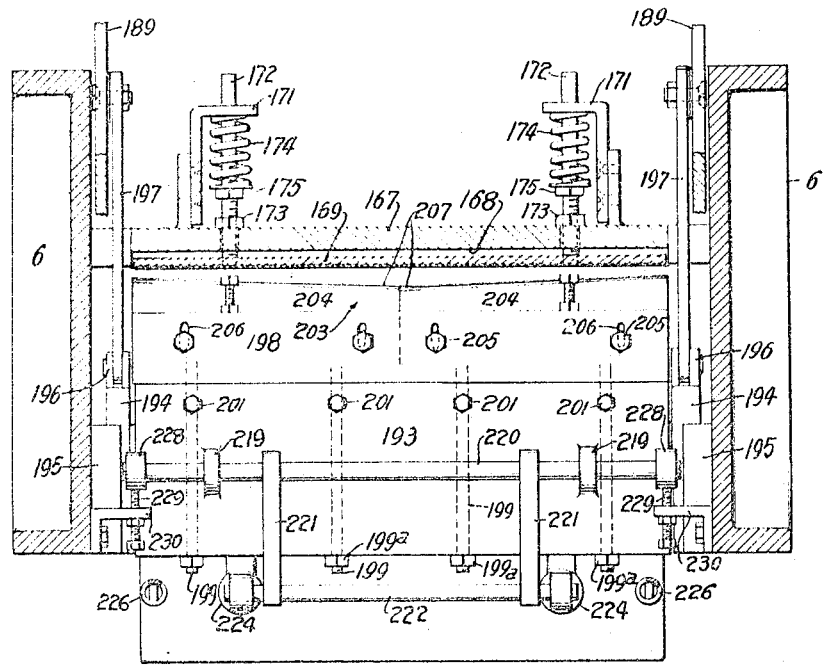
Fig. 9 is a detail horizontal sectional view through the front end of the machine as taken on the line 9—9 of Fig. 8.

In general, my improved machine includes suitable side frame members for supporting the various mechanisms thereof. At the rear end of the machine, which is opposite that end at which the operator is stationed, is provided a longitudinal adjustable carriage or subframe carrying mechanisms which operate successively upon that web of paper providing the plurality of longitudinal strips of the partition. These mechanisms are the stationary dies and associated reciprocating punch, the feed rolls and then the slitters, in the order named. In this manner, the web is first punched and while still in web form, is fed forwardly to be operated upon by the slitters.

The strips thus formed extend forwardly through means which turn said strips into a vertically edgewise position and then they pass through guide means which space said edgewise disposed strips the desired distance apart, there being means associated with said guides for severing said strips after the desired number of transverse strips have been feed thereto and interlocked therewith as will later appear.

The web of paper from which the transverse strips of the finished partition are formed, is passed between feed rolls at the front end of the machine and then downwardly therefrom between suitable dies and associated punches in close proximity to the face of a yieldable plate associated with a stationary cutter bar or blade and into interlocked engagement with the longitudinal strips. After such engagement, a horizontally reciprocating knife bar severs the web against the stationary knife bar. The longitudinal strips are then fed forwardly a distance equalling that of the spacing between the notches in said longitudinal strips, ready for another feed of the second mentioned web of paper through its die and punches, and into interlocking engagement with said longitudinal strips until the desired size of partition has been completed. Thereafter the two sets of assembled strips are tamped into complete interengagement where their top edges are all flush and in the same plane after which the longitudinal strips are severed to provide the finished partition.

Referring now in detail to that embodiment of the invention, illustrated in the accompanying drawings: 1 and 2 indicate respectively, the right and left hand upright side frame members of the machine which are held in the desired spaced relation in any suitable manner. In this respect, it is pointed out that "right" and "left" are used with regard to the position of the machine attendant who stands at the front or discharge end of the machine which is at the left hand end thereof as shown in Fig. 2.

Along the top end of said frame members at the rear, are longitudinal rails 3 and mounted upon each of said rails for a longitudinal adjustable movement is a carriage 4. Each carriage is provided at its ends with clamping bolts 5 so as to securely hold the carriages in the desired adjusted position upon said rails. On the front end of said frame members are secured upright, secondary frame members 6—6 each provided with horizontally disposed, longitudinally extending top and bottom ledges 7 and 8 respectively, for a purpose soon to appear.

Connecting the rear ends of both carriages 4—4 is a transverse supporting bed 9 for a die block or plate 10 and at each end of said bed is an upright guide post 11. Reciprocably mounted on said posts are the sleeves 12 of a cross head 13 upon the bottom of which are adjustably mounted, punches 14. Said punches coact with certain die openings in the block or plate 10 and said openings are arranged in line with an opening 9a in the bed 9 whereby the punchings produced in the operation of the punches fall into a chute 15 for discharge from the machine. On each sleeve 12 is a laterally extending stud 16 the purpose of which will soon appear.

17 indicates a web of paper from which the longitudinal strips 18 of the partition are formed. This web of paper passes in a horizontal plane over a table extension 19 extending rearwardly from the bed 9 and under a hold down plate 19a thereon and then over the die 10 beneath the punches 14 where they are punched to provide certain recesses 18a and openings 18b respectively, in said web. As best shown in Fig. 4 these recesses and openings, are laterally spaced in said web in accordance with the height of the longitudinal strips of the finished partition so that said die and punches are adjustable for such purpose. Associated with the punch and die mechanism just mentioned, is a stripper plate 20.

Just forward of the bed 9 each carriage is formed with a pair of front and rear upright standards 21—22 and between said standards of each carriage is a pair of top and bottom bearing blocks 23—24 for the shaft-like end extensions 25 and 26 respectively, of a pair of top and bottom step by step, geared together, sectional, rotative feed rolls 27 and 28 respectively. The top ends of the standards of each pair of standards are connected by a bridge plate 29 and between each bridge plate and the bearing blocks for the top feed roll are suitable tension inducing and regulating means 30. Said means as is apparent, may be manipulated in a manner permitting separation of said feed roll to permit the threading of the web 17 therebetween. Rising from each bridge plate is an upstanding arm 31 and the arms of both bridge plates are connected together by a transverse rod 32, the purpose of which will soon appear.

On the front end of each carriage is provided a multi-part bearing block 33 in which are journalled the ends of top and bottom and transverse shafts 34 and 35 respectively, and on that end of the shaft 35 extending beyond the left hand side frame member is secured a sprocket 36 as best shown in Fig. 1. Splined on each shaft 34—35 are longitudinal spaced, pairs of split collars 34a—35a respectively, which may be secured to the respective shaft by a clamp screw 37 and best shown in Figs. 12 and 13. Secured to opposed faces of the collars of each pair are cutter discs 38—39 respectively. Preferably each disc is secured to the face of its associated collar by the screws 40. The discs of each pair of discs have beveled edges and the opposed flat faces of the discs of each pair overlap and engage each other as best shown in Figs. 12 and 13. By loosening the clamping screws 37 the collars 34a—35a may be adjusted longitudinally on the respective shafts and then reclamped thereto. In this respect, it is pointed out that those screws 40 arranged near the split in the collar to secure the discs to the collar, pass through arcuate slots in said discs to permit the required movement in the split ends of the collar.

After the web 17 leaves the feed rolls 27—28 it passes between the shafts 34—35 to be slit by the discs 38—39 into the strips or ribbons 18 before mentioned. The cutting discs are always so positioned on the shafts that they slit the web in the planes of the enlarged ends of the recess 18a so that said ends open through one edge of the strips or ribbons thus formed. As the punches 14 and dies 10 are adjustably longitudinally of the cross head 13 and bed 9, and as the cutting or slitting discs 38—39 are adjustable longitudinally on the respective shafts, it is apparent that the strips or ribbons produced from the web may be of any desired width.

It is apparent that with the punching mechanism, the feeding mechanism and the slitting mechanism arranged on the carriage as before described, the pull of the feed rolls 27—28 is exerted upon the wide web of paper 17 instead of upon the slit strips as heretofore so that there is no breakage of said strips with the necessary machine stoppage for web rethreading operations. In this manner both a waste in material and operating time is eliminated.

41 indicates the transversely disposed, main drive shaft of the machine which is journalled at its ends in suitable bearings provided therefor, in the rear end of the side frame members 1 and 2. Loose on said shaft is a pulley 42 driven by a belt 43 from a suitable motor or the like, not shown. Splined on said shaft 41 near the frame member 1 is a clutch member 44 to coact with a clutch member 45 rotative with the pulley 42. Associated with the clutch member 44 is a shifter 46 operable through a suitable linkage 47 from the rear end of a rock shaft 48 journalled in suitable bearings on the side frame member 1 of the machine. The front end of this shaft has a lever 49 fixed thereto in a position convenient for the machine attendant and when said lever is actuated, the shaft 41 may be operatively connected to and disconnected from its associated pulley 42.

The shaft 41 has a pinion 50 fixed thereto which meshes with a gear 51 on a shaft 52 also journalled in the side frame members in the plane of but spaced forwardly of the shaft 41. Fixed on the ends of this shaft 52 outside the frame members, are gears 53. These gears mesh with idler pinions 54 journalled on studs 54a, projecting from the frame members 1 and 2 and these gears in turn mesh with gears 55 on studs 55a also projecting from said side frame members. On that end of the shaft 52 beyond the left hand side member 2 is fixed a sprocket 56 which through a chain 57 continuously drives the sprocket 36 on the transverse shaft 35. Fixed to the shaft 52 near each gear 53 is an eccentric 58 and rotative with each gear 55 is an eccentric 59. By this arrangement the eccentrics 58 and 59 are driven in the same direction.

On each pair of eccentrics 58—59 are block-like straps 60—60 and the straps of each pair are connected together at the top by a bar 61 in which are formed longitudinally spaced holes 61a. On each stud 16 of the crosshead or punch carrier 13 is pivotally mounted one end of an adjustable connecting rod 62, the other end of which has a pivotal connection with a stud 63 disposed in one of the holes 61a in the bar 61. It is apparent that the block-like straps 60 move with a parallel motion and that in this movement the cross head or punch carrier 13 is vertically reciprocated upon the guide posts 11. When it is necessary to adjust the carriages 4 forwardly upon the rails 3 of the frame members for the reason to appear later, the studs 63 are removed from one set of holes 61a in the bars 61 and are then fixed in other ones.

Thus no matter what position the carriages 4—4 have been adjusted to, it is possible to adjust the connection for the rods and studs 62—63 so that there will be no loss in the movement of the punch and dies. Fixed to the outer ends of the shaft 52 beyond the eccentrics 58 and gears 53 thereon are eccentrics 64 for actuating the feed rolls 27—28 in a step by step manner as will soon appear.

Detachably secured to each end of the bottom feed roll shaft 26, outside its associated boxes 24 is a crank arm 65 and 66 respectively and an adjustable rod 67 operatively connects each arm with its strap 68 on an associated eccentric 64. Also removably secured to the end of the feed roll shaft 26 between the blocks 24 and the crank arms 65—66 are ratchet wheels 69 and 70 respectively.

The ratchet 69 is provided with only one tooth 69a and with a blank or dwell 69b as best shown in Fig. 15 while the ratchet 70 has a plurality of teeth 70a as best shown in Fig. 14 and the tooth 69a of the ratchet 69 is radially positioned in a plane midway between the ends of a long tooth 70b on the ratchet 70. Each crank 65—66 carries a spring held pawl 71 for engagement with the associated ratchet and the connecting rod 67 associated with the crank arms 65—66, each has an adjustable slot connection 67a therewith whereby the throw of said arm may be accurately adjusted.

Figure 18:
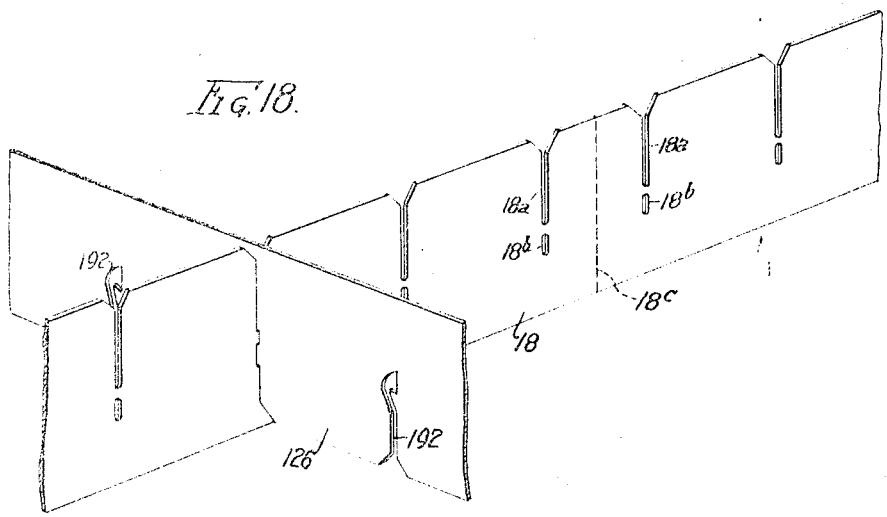
Fig. 18 is a detail perspective view on an enlarged scale illustrating the assembly of the longitudinal and transverse strips of the partition made by the machine.

The teeth 70a of the ratchet 70 are so spaced apart as to feed the web 17 a distance equal to the spacing between the slots and openings in the strips or ribbons 18. However, these strips are not severed transversely in the plane of said slots and openings when the partition has been assembled but this severance is made midway between two of said slots and openings and therefore, at certain intervals in said strips, these slots and openings are spaced closer together as is apparent and as best appears in Fig. 18.

Thus in the rocking movement of the arms 65, 66 the pawl 71 engages a tooth 70a and turns the feed roll through an angle equalling the angle between the teeth 70a and then drags back over the next to advance the same in a similar manner. During this time, the pawl 71 associated with the ratchet 69 merely drags back and forth upon the periphery of said ratchet. When the one pawl 71 is dragging back over the long tooth 70b of the ratchet 70, the other pawl 71 drops behind the tooth 69a of the ratchet 69 to feed it forwardly a distance which is less than that produced by the teeth 70a. Thus in the feed of the web, a number of wider spacings are provided in the strips for the openings and slots 18 and 18a and then a shorter feed is provided and it is at these shorter spaces that said strips are severed when a complete partition has been assembled.

By providing a ratchet with a desired number and spacing of teeth therein and by adjusting the throw of the crank arms, any desired combination of spacing for the slots and openings in the strips may be provided. Also by employing one pawl for the longer feed of strips and another one for the shorter feed, the impact of the pawls against the teeth of the ratchet may be better controlled so that the pawl and teeth are not so soon battered out of shape and the attending jar on the mechanism is avoided.

As the web is thus fed forwardly by the feed rolls 27—28 it passes between the shafts 34—35 with which the cutting discs or slitters 38—39 are associated so that said web is slit into ribbons or strips. The slitters are set to provide the desired width of ribbon or strip and as before mentioned, so slit the web, that the notches 18a open through one edge of the strip. After the web 17 passes through the slitting mechanism, the strips 18 produced thereby, are disposed with their edges in a horizontal plane and must be turned or twisted into a vertical plane, with the notches uppermost before they pass to a certain "feed box" mechanism as will soon appear. To the rear of the secondary frame members 6 and extending transversely between the frame members is located an inverted U-shaped bar 72 having feet 73 resting on and bolted to said side frame members 1 and 2 respectively. In said bar is a longitudinal slot 74 in which the top threaded ends of depending guides 75 are secured by nuts 76. By loosening the nuts, the guides 75 may be adjusted laterally of the machine into the positions required for the desired spacings between the strips before they enter the feed box before mentioned.

Shortly in advance of said guides is provided a feed box supporting member 77 in the form of a transversely extending beam engaged at its ends for a vertical adjustable movement in guides 78 formed on the inside surface of the side frame members. Said beam includes a perpendicularly disposed, internally threaded, sleeve 79 at each end in which is engaged the top end of a screw rod 80 and each rod is journalled near its bottom end in a bearing 81 extending inwardly from an associated side frame member. In line with said rods below the bearings 81 and extending transversely of the machine is a horizontal shaft 82, suitably journalled at its ends in bearings on said side frame members 1 and 2. Said shaft is provided near its ends with bevel gears 83 meshing with like gears 84 operatively engaged on the bottom end of said threaded rods 80 and also fixed to said shaft between the gears 84 is a hand wheel 85. When the hand wheel is turned in the proper direction, it is apparent that the beam 77 may be adjusted upwardly or downwardly.

86 indicates as a whole the feed box before mentioned, which is mounted upon the cross beam 77. Extending longitudinally through said feed box is a shaft 87 carrying gears 88 splined thereon in a manner by which said gears may be adjusted longitudinally upon the shaft. This shaft extends laterally beyond the left hand end of the feed box where it is connected by a universal joint 89 (see Fig. 6) with a short shaft 90 journalled in a bearing bracket 91 projecting laterally from the left hand frame member 2. This shaft is continuously and independently driven from a motor 92 by suitable belt and pulley 93 and with which is associated a belt tightener 94 as best shown in Figs. 1, 6 and 8.

Longitudinally adjustable of the top wall of the box is a plurality of plates 95 in each of which is journalled an upright shaft 96 as best shown in Fig. 7. On the bottom end of each shaft 96 within the feed box is fixed a pinion 97 for engagement with an associated gear 88 on the shaft 87. Fixed to each shaft 96 above the feed box is a feed roll 98. Also longitudinally adjustable on the top wall of said feed box and spaced rearwardly from the plate 95 is a plurality of plates 99, one for each plate 95. On each plate 99 is an upright stud 100 to which is pivotally connected, the rear end of an upright plate-like arm 101, the front end of which carries a roller 102. At each end of the box 86 as a whole is a rearwardly extending arm 103 and mounted in both of said arms and arranged parallel with the box 86, is a shaft 104. Adjustable, longitudinally, on said shaft is a plurality of collars 105, one for each of the plates 95 and 99 respectively. A spring finger 106 which is fixed at its rear end with respect to each collar 105 so engages the plate-like arm 101 as to hold the roller 102 up against an associated roll 98. Thus after the strips 18 leave the members 75 which turn them into a vertically edgewise position, they each pass between the rolls 98 and 102 of a pair of such rolls for a suitable feeding and tensioning as is best shown in Figs. 7 and 11 and with their bottom edges engaged with the top of said plates 95—99 and the top of said box 86 as a whole.

On the front face of the feed box and having an undercut longitudinal adjustable engagement therewith, is a plurality of blocks 107, each carrying an upright stationary knife blade member 108. Fixed to each stationary knife bar is a rearwardly extending guide block 109, one for each roll 96 of the feed box. Associated with each block 109 is a spring-like guide 110, the strip 18 passing between said block and finger after leaving the feed roll 98 and its associated tension roll 102. Pivoted on each stationary knife member 108 as at 111 is a swingable knife blade member 112 and the bottom ends of all of said members or blades are adjustably connected to a transversely disposed reciprocating bar 113. The bar 113 is connected at its right hand end to one end of a link 114, the other end of which is connected to an arm 115 fixed to and depending from a short, longitudinally extending rock shaft 116 journalled in bearings 117 provided therefor on the right hand side frame member 1 as best shown in Figs. 2 and 10.

Also fixed to said shaft 116 is an upstanding arm 118 carrying a roller 119 at its top end for engagement with an actuating cam as will later appear. Thus the bar 113 which is connected to all the knife blade members 112 is positively actuated in one direction by said arms 115—119 and is moved in the other direction by a spring 120 which is connected at one end to the arm 115 and is connected at its other end to the left hand frame member 2.

It is apparent from the foregoing that it is possible to change or adjust the elevation of the feed box 86 and the cut off knife blade members 108—112 operating upon the strips 18 simply by turning the hand wheel in the proper direction. In this connection it is further apparent that because of the link connection between the bar 113 and arm 115, sufficient flexibility is present so as to in no manner interfere with the operation of said knife blade members regardless of the elevation in which the feed box happens to be positioned. In this respect, it is further pointed out that this part of the machine can be adjusted to take care of conditions wherein different heights of strips 18 are required.

On the front end of the machine frame members 1 and 2 are mounted brackets 121 having an adjustable bolt and slot connection 122 with said frame members as best shown in Fig. 8. These brackets are connected together by a table 123 upon which is mounted a table plate 124 which extends a considerable distance rearwardly toward the feed box and it is upon this table plate 124 that the strips forming the partitions are assembled and further operated upon as will appear later. The top surface of said table plate is disposed in the plane of the top surface of the feed box 86 and the plates 95—99 thereon so that the bottom edges of the strips 18 are supported in a manner devoid of any sagging wherein they span the space between said box and the table. Thus when the feed box is adjusted upwardly or downwardly the table plate 124 may be adjusted to coincide therewith by adjusting the bolt and slot connection 122 of the brackets 121 on the front ends of the side frame members 1 and 2.

125 indicates a second web of paper from which the cross strips 126 of the partition are formed. This web of paper is fed from a suitable supply roll so as to pass over a platform or table 127 which is supported in a plane above the machine but inclined downwardly toward the front end thereof. This table is mounted on a frame 127a, the rear end of which is supported by the cross shaft 32 before mentioned while its front end is pivotally mounted upon a second cross shaft 128 mounted in brackets 129 adjustably connected to the rear top ends of the secondary frame members 6 as best shown in Figs. 1, 3 and 7. Associated with said platform or table 127 is a hold down plate 130 whereby the web is maintained in a smooth and substantially taut condition as it feeds over the table.

The front end of this table 127 overhangs one of a pair of coacting step by step rotative, front and rear feed rolls 131 and 132 respectively, extending between L-shaped members 133 fixed upon the ledges 7—7 of the frame members 6—6. The rear roll 132 is mounted at its ends in bearing boxes or blocks 134 engaged upon the L-shaped members 133 up against suitable shoulders at the rear thereof. The front roll 131 is mounted at its ends in elongated bearing blocks 135 on the front ends of said members 133 and both rolls are geared together at their left hand ends as at 136 and best shown in Fig. 6. To the front ends of the bearing blocks 135 are secured extension plates 137 in which is journalled a cross shaft 138 carrying eccentrics 139 at its ends, for engagement with the downturned front ends 140 of bars 141 overhanging the boxes 134 and 135 and fixed at their rear ends to the like ends of the L-shaped members 133. On one end of said shaft 138 is fixed a ratchet disc 142 and a lever 143, and a lever-like dog or pawl 144 pivoted on the associated extension 137 may be operatively engaged with said disc. When the lever 143 is pulled forwardly, it acts through the shaft 138 and eccentrics 139 to urge the roll 131 into a good feeding engagement with the roll 132 and the parts are locked in this position by the pawl or dog 144. When threading the web 125 between said feed rolls, the close engagement of said feed rolls is released by swinging the lever 143 forwardly, after manipulating the pawl or dog 144 to release the ratchet disc 142. After the web has thus been threaded between said rolls, the lever is swung rearwardly to bring the roll 131 into a good close feeding engagement with the roll 132 and is locked in this position by said pawl 144. By this arrangement an even feed is imparted throughout the entire width of the web and this feed cannot be jarred out of adjustment due to vibration of the machine as the rolls are positively locked in position by the pawl 144.

Fixed to the shaft 138 midway between the ends is the front end of a rearwardly extending bracket 145 which engages at its rear end in an annular groove 146 provided therefor in the front roll 131. In said bracket is mounted for guided movement a block 147 carrying a slitting disc 148 having engagement with the periphery of the rear feed roll 132. The block 147 has extending thereinto, one end of a bolt 149 carried by a bar 150 fixed to the bracket 145. A nut 151 is mounted on the bolt 149 and a spring 152 surrounds said bolt between said nut and block 147. This spring urges the block 147 downwardly and inwardly toward the roller 132 to operatively engage the disc with the periphery of the roll 132. With such an arrangement, a web 125 of a width twice the width of the finished partition, may be employed and which web is slit longitudinally on its median line. Thus instead of making but a single partition each time, two of such partitions are so produced and the output of the machine is thus doubled.

The roll 132 has fixed to the left hand end of its shaft beyond the box 134, a ratchet wheel 153 which is actuated by a spring pressed pawl 154 mounted on a plate 155 in turn rockably mounted on said shaft end. This plate has pivotally connected to it, one end of an adjustable connecting rod 156, the other end of which is connected to an arm 157 on a transverse rock shaft 158 journalled in suitable bearings 159 fixed to the side frame members 1 and 2 as best shown in Figs. 1 and 2. The shaft 158 has fixed thereto, a second arm 160 having openings 160a therein to the desired one of which is connected one end of a longitudinally adjustable pitman 161 the other end of which has a suitable strap connection with an eccentric 162 on the shaft 52 before mentioned. It is apparent that when the machine is in operation a rocking movement is imparted to the shaft 158 and through the arm 157 therein and its associated connecting rod 156, a rocking movement is imparted to the pawl carrying plate 155. In the rocking movement of this plate, the pawl 155 engages the ratchet 153 to impart a step by step movement to the feed rolls 131—132. By means of the adjustability of the parts, it is apparent that by so adjusting them and by substituting the proper ratchet 153 on the feed roll 132 the desired length of feed may be obtained for the web 125.

After the web 125 leaves the feed rolls 131—132 and the slitting disc 148 which slits the web into two parts, said parts pass down through a slot provided on one side by a vertically disposed die plate 163 and on the other side by a stripper and guide plate 164. The die plate 163 is mounted upon and backed up by a backing plate 165 extending between the secondary frame members 6—6 in substantially the plane of the front of the feed roll 132. In said stripper, die, and cross plates, respectively, are registering die openings 166 with which certain punches coact as will later appear, to punch the two parts of the web as they are fed downwardly through the slot between the die and stripper plates.

Associated with the bottom end part of the backing plate 165 is a reinforcing plate 167 secured at its ends to the secondary frame members 6—6. Said plate includes a shoulder along its front face upon which is engaged the like end of the die plate. In the front face of said reinforcing plate below said shoulder is provided a shallow recess 168 in which is located a yielding presserfoot plate 169 and on the bottom edge of said reinforcing plate is secured a horizontally disposed, stationary knife bar 170. On the rear face of the reinforcing plate 167 in line with the recess 168 are rearwardly extending brackets 171. Secured to the presserfoot plate 169, are guide rods 172 which extend rearwardly through the reinforcing plate and said brackets, whereby the presserfoot plate is capable of a limited yielding movement longitudinally of the machine as a whole. Nuts 173 best shown in Fig. 9 limit the forward movement of said presser bar plate. Springs 174 surround the guide rods 172 between the brackets 171 and nuts and washers 175 on said rods and which rods urge the presserfoot plate forwardly until stopped by the engagement of the nuts 173 with said reinforcing plate.

It is pointed out at this time that when the parts are in their normal position the front face of the presserfoot plate is flush with and in the plane of the front face of the die plate and the front or cutting edge of the fixed cutter bar 170 is disposed slightly to the rear of said plane. It is further pointed out that both the die and stripper plates 163 and 164 are adjustable laterally with respect to the backing plate so as to provide the proper spacing of said plates on the backing plate.

To dispose of the punchings discharged from the die openings 166 before mentioned, I provide to the rear of the reinforcing plate 167, a chute 176. This chute includes branches 177 that discharge beyond opposite sides of the machine, and said chute is supported from the reinforcing plate as best shown in Fig. 7. In Fig. 6 however, the chute branch 177 on the right hand side of the machine has been omitted purposely to better show the parts of the machine located thereeneath.

On the ledges 8 of the secondary frame members are secured grooved rails 178 in which slide the guides 179 formed on opposite sides of a horizontally disposed, longitudinally reciprocable cross head 180. At the rear end of said cross head is an upstanding flange 181 to the rear face of which are secured, vertically spaced undercut rails 182. Adjustable in said rails are blocks 183 carrying punches 184 in line with the die openings 166 before mentioned. Said rails are adjustably secured to said flange 181 by bolts 185 and threaded into said flange in line with said punch blocks are set screws 186. By loosening the screws 186 and bolts 185, the blocks 183 may be moved or shifted laterally on said flange so that the punches can be lined up with respect to the die openings. After so adjusting said blocks, they may be locked in place by tightening up said bolts and screws.

Rising from each side of the cross head, are upright ears 187 in which is journalled a transverse shaft 188 and to each end of said shaft outwardly beyond said ears is operatively engaged one end of a connecting rod 189. Said rods which are disposed just inside the frame members 1 and 2, extend downwardly and rearwardly therefrom, through openings provided therefor in the reinforcing plate 162, toward the shaft 52. Said shaft is provided near each of its ends, inside said frame members 1 and 2, with eccentrics 190 on each of which is operatively engaged a strap 191 carried by the rear end of the associated connecting rod 189. It is apparent from the foregoing that in the rotation of the shaft 52, the rods 189 will impart a longitudinal reciprocating movement to the cross head 180. In said movement of the cross head, the punches 184 carried thereby, will coact with the die openings 166 to provide openings 192 in the web 125 and which openings, in the cross strips 126 produced from said web, will interengage and lock with the recesses and openings 18a and 18b in the longitudinal strips.

Below the cross head 180 is located a reciprocating knife actuating plate 193 which is formed at its sides with rails 194 that slide in longitudinal grooves in blocks 195 in each secondary frame member 6—6. Near its rear end, at each side thereof, said plate 193 is provided with ears 196 and these ears are connected by links 197 with the connecting rods 189 before mentioned. Thus as the cross head 180 is longitudinally reciprocated a like movement is imparted to the plate 193.

Associated with the rear end of said plate 193 is a knife bar carrying plate 198 having secured to the front ends thereof, longitudinally extending, laterally spaced rods 199 that extend through openings 200 in the actuating plate 193. While said openings are of a width approximating that of said rods, when considered vertically, they have dimensions greater than that of the diameter of said rods so that there is a relative play in that direction. In said plate however, in line with said openings, are adjustable top and bottom set screws 201 and on the front ends of said rods are nuts 199a. Thus by manipulating the screws 201 and nuts 199a, it is possible to adjust within certain limitations, the vertical position of the knife bar carrying plate with respect to the actuating plate.

In the rear face of the carrying plate are adjustable devices in the form of bolts 202 which in the rearward part of the reciprocation of the knife bar actuating and carrying plates, engage the web 125 in line with the presserfoot bar 169 and projects the same inwardly against the action of the springs 174. On the bottom surface of the knife bar carrying plate, is a knife bar 203 made in two sections, 204—204 respectively, and these knife bar sections are secured in place by bolts 205 which extend down through longitudinal openings 206 in the supporting plate and are threaded into the knife bar sections as best shown in Fig. 9. The combined width of said knife bar sections approximates the width of the web 125 upon which they operate and the cutting edge of each section is inclined or angled from these outer ends, in toward the median line of the machine as a whole as best shown at 207 in Fig. 9.

The knife bar 203, in the reciprocation of the associated actuating and carrying plates, coacts with the fixed knife bar 170 in severing the bottom margin from the web 125 to form the cross strips 126 and this severance is coincident with the bottom ends of the openings 192 in said web. By means of the rods 199 of the carrying plate and the set screws 201, it is possible to adjust the carrying plate 198, so that the knife bar 203 carried thereby can be accurately adjusted for positioning with respect to the fixed knife bar so that their respective cutting edges can be brought into the best operative positions. In this respect, it is further pointed out, that by angling the cutting edges 207 of the knife bar sections 204, said edges operate with a true shearing action on the web, from both margins in toward the middle thereof. With such a shearing action, the web is severed with a smooth edge and the knife bar sections not only remain sharper for longer periods, but the tendency to tear the web with attending jamming action is reduced to a minimum.

On the right hand side member of the frame member 1, shortly in advance of the arm 115 before mentioned, is secured an upstanding bracket 208. This bracket is spaced laterally from the associated secondary frame member 6 and coacts with the same to provide bearings for a short transversely extending shaft 209. Loose on this shaft is an arm 210 and between said arm and the bracket 208 a ratchet wheel 211 is rotatively mounted on said shaft. The arm 210 carries a spring pressed pawl 212 for engagement with the teeth of the ratchet wheel and said arm has openings 213 therein, in any one of which a pin 214 may be inserted to operatively connect said arm to the front end of a connecting rod 215. Said rod extends downwardly and rearwardly toward the shaft 52 where it carries a strap for operative engagement on an eccentric 216 fixed on said shaft 52 as best shown in dotted lines in Fig. 3. By this arrangement, the throw of the arm 210 and the angular rotative step by step movement of the ratchet wheel may be controlled. To prevent an overrun of said ratchet when actuated by the pawl, an adjustable friction brake 217 is provided on the bracket 208 to engage the hub of said ratchet wheel.

On the inner face of said ratchet wheel is provided diametrically oppositely disposed projections or humps 218 which in the rotation of said ratchet wheel engage the roller carried by the arm 118 before mentioned, to actuate the bar 113 in one direction. As this bar has the bottom ends of the knives 112 connected thereto, it is apparent that said knives will coact with the stationary knife members 108 to sever the strips 18.

In the downward feed or movement of the web 125, said movement is so timed with respect to the feed of the strips 18, that said web is partially fed into said strips, with the notches 192 engaging with the notches 18a—18b of the strips 18. After said parts have been so engaged the knife bar 203 operates in connection with the fixed knife bar 170 as before described to sever the web to provide the cross strip 126, after which the strips 18 are again fed forward. In the rearward movement of the knife bar 203, the members 202 engage the plate 169 and push the same rearwardly as said knife bar 203 coacts with the knife bar 170 to sever the web 125. In the forward movement of the knife bar 203, the springs 174 act to move the plate 169 and the bottom end of the web 125 forwardly and this moves said web into a plane just forward of the plane of the cutting edge of the knife bar 170. Thus said edge of the web is in a position to clear the knife bar 170 upon the next feed of the web. Thereafter the web 125 is fed downwardly into engaging relation with the strips 18 and said web 125 is again severed to provide the next cross strip and so on until the desired number of cross strips are engaged with the longitudinal strips 18 to form a complete partition. At this time, the knives 112 are actuated to sever the strips 18 and the operation goes on as before.

It is apparent that the line of severance of the web 125 is in a plane slightly above that of the top edges of the strips 18 due to the position of the respective knife bars 170 and 203 as best shown in Fig. 7. To bring the top edges of the cross strips 126 even or flush with the like edges of the longitudinal strips, I provide an automatic means which tamps the cross strips down into such flush relationship after they have cleared the knife carrying bar and a part of the actuating plate and such means are as follows:—

On the actuating plate 193, I provide a pair of upstanding ears 219 in which a rock shaft 220 is journalled. Secured to said shaft near said ears are forwardly extending arms 221 which are bifurcated at their front ends to receive a cross shaft 222. Fixed to and depending from this cross shaft are perpendicular rods 223 which have sliding guided bearing in ears 224 on the front end of the actuating plate 193. To the bottom ends of said rods 223 is fixed a vibrating tamping plate 225 of a width approximating the width of the partitions made by the machine and the rear end of said tamping plate is curved upwardly as best shown in Fig. 7. Springs 226 are fixed at one end to said plate and are fixed at their other ends to forwardly extending rods 227 carried by the cross head 180. Said springs normally act to lift the tamping plate 225 upward.

On the extreme ends of the shaft 220 are secured short depending arms 228 arranged in the plane of longitudinally adjustable stops 229 in the form of screws, each carried by an associated bracket 230 extending inwardly from a frame member 6. In the outward movement of the plate 193, said arms 228, will engage the stops 229 and will swing said arms rearward and rock the shaft 220 in a clockwise direction as viewed in Fig. 7. This will cause the arms 221 to swing downwardly, depressing the shaft 222 and the tamping plate through the guide rods 223 against the action of the springs 226. In this downward movement of the tamping plate, the same will engage the top edge of the cross strips 126 and will tamp them down with the table plate 124 as a support so as to be flush or even with the top edges of the longitudinal strips. In the rearward movement of the plate the arms 228 move away from the stops 229 and the springs 226 will function to lift the tamping plate ready for the next movement and so on. By adjusting the screws 229 providing the stops mentioned, the movement of the tamping plate may be regulated so as to be operative for its intended purpose upon different heights of partition strips.

In the operation of the machine the web 18 as it is fed with a step by step pulling action by the feed rolls 23—24 is operated upon by the punches 14 and die plate 10 and the punched web then passes through the slitting mechanism between the slitting rolls wherein the web is slit longitudinally to provide the ribbons or strips 18 with the openings 18a—18b therein. These ribbons or strips are disposed horizontally edgewise and are turned into a vertical edgewise position with the notches 18b uppermost, by the members 75 before said ribbons or strips pass between the continuously rotating rollers 98 and associated tension rolls 102 of the feed box mechanism. These elements not only keep said ribbons tensioned, but also act to feed them forwardly between the stationary knife blocks and guide fingers 108 and 110 respectively.

As the web 125 passes down between the die plate 163 and stripper plate 164 with a step by step movement, it is first slit along its median line by the disc 148 associated with the feed roll 132 and is then operated upon by the dies and punches 184 and is then fed down against the front face of the yielding presserfoot plate 169, across the edge of the fixed cutter bar 170, into interengaging position with the strips 18. When such interengagement has been completed, the knife bar 203 moves rearwardly and coacts with the bar 170 to sever the web 125 into the cross strips 126 of the finished partition. After the cross strips are assembled with the longitudinal strips the assembled structure moves forwardly step by step. As said structure approaches the plane of about the front end of the actuating plate 193, the tamping plate 225 tamps the cross strip into complete interlocking engagement with the longitudinal strips so that the top edges of both sets of strips are brought into the same plane.

The feed of the ribbons 18 is of course, primarily governed by the feed rolls 23 and 24 and the feed of said ribbons for the spacing between the transverse strips, is governed by the teeth 70a—70b of the ratchet 70. When the desired number of transverse strips has been interengaged with the longitudinal strips, then said longitudinal strips must be severed and this severance is along a line between two of the notches 18a and such a line of severance is indicated at 18c in Fig. 18. Thus a shorter feed must be produced and this feed is taken care of by the ratchet wheel 69 and its pawl after which, the other pawl acts to take up the regular step by step feed.

The machine is capable of universal adjustment to make partitions of different lengths and of different heights. Furthermore the spacing between the transverse strips may be readily provided for by the substitution of the proper ratchet wheels associated with the various feed rolls and by the regulation of the throw for such wheels.

It is important in making adjustments for finished partitions of different lengths that the feeding, slitting and punching mechanisms on the carriages 4 be spaced from the cut-off knives 170—203 a distance which equals in length the combined length of a number of finished partitions. This adjustment may be taken by loosening the nuts associated with the bolts 5 and shifting said carriages 4 in the desired direction and then by tightening up said nuts.

For partitions of different heights, the feed box 86 and associated parts may be adjusted vertically by actuation of the hand wheel 85 and the table plate 124 may be adjusted to suit the adjustment of the feed box.

With the arrangement before described, I am enabled to produce a machine of this kind which is universally adjustable to meet all requirements and this without the necessity of substantial complete disassembly and rebuilding of the machine for each and every type of partition required.

While in describing the invention, I have referred in detail to the form, arrangement and construction of the various parts thereof, the same is to be considered merely as illustrative so that I do not wish to be limited thereto except as may be specifically set forth in the appended claims.

I claim as my invention:—

1. In a machine of the kind described, the combination of side frame members and means on said frame members for operating upon a web of paper to provide punched strips therefrom, said means comprising web punching mechanism, web feeding mechanism and web slitting mechanism respectively, arranged in longitudinally spaced relation in the order mentioned.

2. In a machine of the kind described, the combination of side frame members, means for operating upon a web of paper to provide punched strips therefrom, said means comprising web punching mechanism, web feeding mechanism respectively and web slitting mechanism, arranged in longitudinally spaced relation in the order mentioned, and means for supportingly adjusting said mechanisms as a group, longitudinally of the side frame members.

3. In a machine of the kind described, the combination of side frame members, means for operating upon a web of paper to provide punched strips therefrom, said means comprising web punching mechanism, web feeding mechanism and web slitting mechanism respectively, arranged in longitudinally spaced relation in the order mentioned, and means providing carriages mounted on said frame members for longitudinal adjustment and supporting said mechanisms.

4. In a machine of the kind described, the combination of side frame members, vertically reciprocating web punching mechanism, step by step rotative feed roll mechanism for said web and mechanism for slitting the web into strips after it leaves the feed roll mechanism, said mechanisms being arranged in longitudinally spaced relation in the order mentioned.

5. In a machine of the kind described, the combination of side frame members, vertically reciprocating web punching mechanism, step by step rotative feed roll mechanism for said web and mechanism for slitting the web into strips after it leaves the feed roll mechanism, said mechanisms being arranged in longitudinally spaced relation in the order mentioned, and means for supporting said mechanisms as a unit and which means is longitudinally adjustable of the frame members.

6. In a machine of the kind described, the combination of side frame members, vertically reciprocating web punching mechanism, step by step rotative feed roll mechanism for said web and mechanism for slitting the web into strips after it leaves the feed roll mechanism said mechanisms being arranged in longitudinally spaced relation in the order named and, said punching mechanism and said feed roll mechanism respectively being longitudinally adjustable upon said frame members, transverse shafts in said frame members and means for translating the rotary movements of said shafts into reciprocating movement for the punching mechanism and step by step movement of said feed roll mechanism, said means being adjustable to compensate for the various positions into which said last two mechanisms may be moved upon said side frame members.

7. In a machine of the kind described, the combination of side frame members, vertically reciprocating web punching mechanism, step by step rotative feed roll mechanism for said web and mechanism for slitting the web into strips after it leaves the feed roll mechanism, said punching mechanism and said feed roll mechanism being longitudinally adjustable upon said frame members, a transverse shaft in said side frame members, an eccentric driven by said shaft, a strap associated with said eccentric, a rod connected to said punching mechanism and to said strap for adjustment in a horizontal plane and means for imparting a step by step rotative movement to said feed roll mechanism.

8. In a machine of the kind described, the combination of side frame members, vertically reciprocating web punching mechanism, step by step rotative feed roll mechanism for said web and mechanism for slitting the web into strips after it leaves the feed roll mechanism, said punching mechanism and said feed roll mechanism being longitudinally adjustable upon said frame members, a transverse shaft in said side frame members, an eccentric driven by said shaft, means between said eccentric and feed rolls for imparting the step by step movement thereto, a pair of second eccentrics driven by said shaft, straps on said pair of second eccentrics, a bar connecting said last mentioned straps and a rod connecting said bar and said punching mechanism respectively, said rod and bar being formed for relative adjustment to compensate for the position into which said punching mechanism may be moved on said side frame members.

9. In a machine of the kind described, side frame members, web punching mechanisms, longitudinally adjustable upon said side frame members including dies and a vertically reciprocating punch carrying member, a pair of eccentrics rotative in the same direction and with respect to said side frame members, straps arranged on said eccentrics, a bar connecting said straps to move with a parallelogram motion, a rod connected at one end to said punch mechanism and means for operatively connecting the other end of said rod with different points along said bar.

10. In a machine of the kind described, a web feeding mechanism comprising top and bottom feed rolls having shaft extensions, a ratchet wheel removably secured on the shaft extension of one roll and having a plurality of arcuately spaced teeth thereon and a dwell between certain two of said teeth, a ratchet wheel on the shaft extension at the other end of said last mentioned roll and having only a single tooth disposed in the angular plane of said dwell and rockable crank arms and pawls on said shaft extension for engagement with the associated ratchet wheel to impart a differential in step by step feed to said rolls.

11. In a machine of the kind described, web punching means, feeding means and means for slitting the web into strips, strip severing mechanism and associated strip tensioning and feeding means and means between said strip tensioning and feeding means and said web slitting means for turning the slit strips from a horizontal plane into a vertical plane before they enter said strip tensioning and feeding means, said strip turning means comprising a plurality of bars arranged at a right angle to the length of said strips and all supported from at least one end thereof.

12. In a machine of the kind described, web punching means, feeding means and means for slitting the web into strips, strip severing mechanism and associated strip tensioning and feeding means and a plurality of vertically disposed members arranged between said strip tensioning and feeding mechanism and said web slitting mechanism, there being one of said vertically disposed members for each strip for turning it from a horizontal plane to a vertical plane as it enters said tensioning and feeding mechanism and means extending transversely of the machine and operatively supporting all of said members, each from at least one end thereof.

13. In a machine of the kind described, web punching means, feeding means and means for slitting the web into strips, strip severing mechanism and associated strip tensioning and feeding means and a plurality of vertically disposed pendently supported members arranged between said strip tensioning and feeding mechanism and said web slitting mechanism, there being one of such members for each strip for turning it from a horizontal plane into a vertical plane before it enters said tensioning and feeding mechanism.

14. In a machine of the kind described, web punching means, feeding means, and means for slitting the web into strips, strip severing mechanism and associated strip tensioning and feeding means and a plurality of transversely adjustable, pendently supported members arranged between said strip, feeding and tensioning mechanism and said web slitting mechanism for turning the various strips from a horizontal into a vertical plane before said strips enter said strip tensioning and feeding mechanism.

15. In a machine of the kind described, side frame members, a feed box mechanism including strip tensioning and feeding mechanism, means carried by the feed box for severing said strips and means for supporting said feed box mechanism from the side frame members for a vertically adjustable guided movement.

16. In a machine of the kind described, side frame members, a feed box mechanism including strip tensioning and feeding mechanism, means carried by the feed box for severing said strips and a member vertically adjustable in a guide upon each side frame member and which members support the feed box mechanism, and means operable to raise or lower said members simultaneously.

17. In a machine of the kind described, side frame members, a feed box mechanism including strip tensioning and feeding mechanism, means carried by the feed box for severing said strips and a member vertically adjustable in a guide on each side frame member and which members support the feed box mechanism, a screw operatively engaged with each member, a cross shaft journalled in said side frame members and means operable in the rotation of said shaft for simultaneously turning both screws in the desired direction to raise or lower the feed box mechanism.

18. In a machine of the kind described, means for assembling longitudinal and transverse partition strips and means operating upon said strips after assembly for bringing the like edges of said strips into the same plane and means for adjusting the operative movement of said last mentioned means so that the same may be set to operate upon strips of different heights.

19. In a machine of the kind described, means for assembling longitudinal and transverse partition strips upon a support and means cooperating in conjunction with said support for bringing the like edges of said strips into the same plane a part of said last mentioned means being adjustable toward and away from said support to be set for operation upon strips of different heights.

20. In a machine of the kind described, means for assembling longitudinal and transverse partition strips upon a support for the bottom edges of certain strips, means operating with a reciprocating movement upon the top edges of certain other strips for bringing said edges into the plane of the like edges of the first mentioned certain strips and means for adjusting the stroke of said last mentioned means so that the same may be set to operate upon strips of different heights.

21. In a machine of the kind described, means for assembling longitudinal and transverse partition strips, a member against which one edge of certain strips are engaged, means adapted for engagement with the other edge of certain other strips, said member and means having a relative movement toward and away from each other to bring the like edges of both the longitudinal and transverse strips into the same plane and means for adjusting the amount of relative movement between said member and last mentioned means whereby strips of different heights may be operated upon.

22. In a machine of the kind described, means for assembling longitudinal and transverse partition strips, a member against which one edge of certain strips are engaged, a second member adapted for engagement with the other edge of certain other strips and one of said members having a vibratory movement to bring the like edges of both the longitudinal and transverse strips into the same edge and means for adjusting the length of the stroke of vibratory movement of said one of said members.

23. In a machine of the kind described, means for assembling longitudinal and transverse partition strips, a member providing a support for the bottom edges of the longitudinal strips, means for engaging the top edges of the transverse strips for moving them into the plane of the like edges of the longitudinal strips, said means having a vibratory movement and means for adjusting the length of stroke of vibratory movement for said last mentioned means.

24. In a machine of the kind described, means for assembling longitudinal and transverse partition strips, a member providing a support for the bottom edges of the longitudinal strips and means for engaging the top edges of the transverse strips for moving them into the plane of the like edges of the longitudinal strips, said member providing said support for the bottom edges of the longitudinal strips being adjustable toward and away from said means.

25. In a machine of the kind described, means for feeding longitudinal strips, means for feeding a transverse web into substantially complete interengagement with said longitudinal strips, means movable in the general direction of said longitudinal strips to sever the web to provide a transverse strip, means movable with said severing means and also movable in the plane of the edges of said strips for bringing the like edges of both strips into the same plane.

26. In a machine of the kind described, means for feeding longitudinal strips, means for feeding a transverse web into substantially complete interengagement with said longitudinal strips, means movable in the general plane of said longitudinal strips for punching said web previous to its engagement with said longitudinal strips, means movable in the general plane of said punching means for severing the web after interengagement with said longitudinal strips to provide a transverse strip and means movable with said severing means and also in a plane at a right angle to said movement for engaging the transverse strips and for moving the same into complete interengagement with said longitudinal strips to bring like edges into the same plane.

27. In a machine of the kind described, horizontally reciprocating web punching means, horizontally reciprocating means for severing the web into strips and means movable with said punching means and severing means respectively and also capable of movement in a plane at a right angle thereto for exerting a tamping action on said transverse strips.

28. In combination with horizontally reciprocating web severing means, strip tamping means carried thereby and mounted for movement in a direction at a right angle thereto, and a means carried by said severing means and operating with a rocking action in the movement of said severing means to impart movement to said strip tamping means in said right angle direction.

29. In combination with a horizontal reciprocating web severing means carrying a knife at one end, strip tamping means at the other end of said means, means providing guided vertical movement for said strip tamping means and arms rockable in the movement of said web severing means for imparting a vertical movement to said tamping means.

30. In combination with a horizontal reciprocating web severing means carrying a knife at one end, strip tamping means at the other end of said means, a rock shaft mounted on said severing means, bell crank levers carried upon said shaft, means providing stop members, said lever including arms engaged with said tamping means and other means engageable with said stops in the movement of said severing means in one direction for positively moving said tamping means in one direction.

31. In combination with a horizontal reciprocating web severing means carrying a knife at one end, strip tamping means at the other end of said means, a rocking shaft mounted on said severing means, bell crank levers carried upon said shaft, means providing stop members, said lever including an arm engaged with said tamping means and another arm engageable with said stops in the movement of said severing means in one direction for positively moving said tamping means in one direction, and other means operating in the movement of the severing means in the other direction for moving said tamping means in a direction opposite to that before mentioned.

32. In a machine of the kind described, a fixed knife blade, a support for the same, a yielding plate carried by said support and over which a web is fed past said fixed knife blade, a second knife blade movable toward and away from the fixed blade and coacting therewith to sever said web and means movable with said movable blade for depressing said plate as the movable knife blade moves into operative relation with respect to the fixed knife blade.

33. In a machine of the kind described, a fixed knife blade, a support for the same and having a recess therein above said blade, a plate yieldably mounted in said recess and over which a web is vertically fed past said fixed knife blade, a knife blade carrier and a blade carried thereby for horizontal movement toward and away from said fixed knife blade, and means mounted on said carrier for engagement with said plate as the blade on said carrier moves into operation with said fixed blade to sever the web.

34. In a machine of the kind described, a fixed knife blade, a support for the same, a depressible plate on said support over which a web is fed vertically and past said fixed blade, a member movable toward and away from said plate, a knife blade mounted thereon for cooperation with said fixed blade to sever said web, means movable with said carrier for engaging said plate and means for adjustably mounting the blade upon said carrier whereby the cutting edge therefor may be positioned with respect to the associated edge of the fixed cutting blade.

35. In a machine of the kind described, means for feeding longitudinal strips, means for feeding a transverse web into substantially complete interengagement with said longitudinal strips, a carriage mounted for movement toward and away from said transverse strips, a knife blade mounted on said carriage for severing said web into transverse strips, and means for connecting said carriage and blade and including parts whereby said blade may be adjusted in a plane parallel with the longitudinal strips and also in a direction at a right angle thereto.

36. In a machine of the kind described, means for feeding longitudinal strips, means for feeding a transverse web into substantially complete interengagement with said longitudinal strips, a punch carriage mounted for movement toward and away from said web, a blade carriage also mounted for movement toward and away from said web, means for imparting movement to said carriages, a rock shaft mounted on one of said carriages, a tamping member mounted on said one of said carriages for movement in the plane of the edges of said strips for tamping the transverse strips into complete engagement with the longitudinal strips, a power transmitting arm between said shaft and tamping member, a stop on a fixed part of said machine, means carried by said shaft and engageable with said stop in the movement of said one of said members in one direction to actuate said arm to move said tamping member in one direction, and means between said tamping member and the other carriage to impart a movement to said tamping member in the other direction.

37. In a machine of the kind described, means for feeding longitudinal strips, means for feeding a transverse web into substantially complete interengagement with said longitudinal strips, a punch carriage mounted for movement toward and away from said web, a blade carriage also mounted for movement toward and away from said web, means for imparting movement to said carriages, a tamping member, means on one of said carriages for providing a guided movement of said tamping movement toward and away from the assembled strips in the plane of the edges thereof for tamping them into complete engagement, a rock shaft mounted on said one of said carriages, a power transmitting arm carried by said shaft and engaged with said tamping member, a stop on a fixed part of said machine, means fixed on said shaft and engageable with said stop in the movement of said one of said members in one direction to actuate said arm to move said tamping member toward said strips, and means between said tamping member and the other carriage for imparting a movement to said tamping member in the other direction.

38. In a machine of the kind described, means for feeding longitudinal strips, means for feeding a transverse web into substantially complete interengagement with said longitudinal strips, a punch carriage mounted for movement toward and away from said web, a blade carriage also mounted for movement toward and away from said web, means for imparting movement to said carriages, a rock shaft mounted on the blade carriage, a tamping member mounted on the blade carriage for movement toward and away from said strips for tamping the transverse strips into complete engagement with the longitudinal strips, a power transmitting arm between said shaft and tamping member, a stop mounted on a fixed part of the machine, means carried by said shaft and engageable with said stop in the movement of said blade carriage in one direction to actuate said arm to move the tamping member in one direction, and means between said punch carriage and tamping member to impart a movement to said tamping member in the other direction.

39. In a machine of the kind described a backing plate, a die plate supported thereby, a cutter bar fixed to said backing plate, a presserfoot plate, means for mounting the same for a yielding guided movement in said backing plate, punches, a second cutter bar, means for moving said punches and second cutter bar, toward and away from said die plate and said first mentioned bar and means movable with the second cutter bar for engaging the presserfoot plate in timed relation with respect to said second cutter bar.

40. In a machine of the kind described, a perpendicularly arranged backing plate having a recess in its bottom end, a cutter blade fixed to the bottom end of said backing plate, a die plate fixed to the top end of said backing plate, a presserfoot plate arranged in a recess in the bottom end of said backing plate, means fixed to said presserfoot plate and having a yielding sliding guiding bearing in said backing plate, a punch carrying member, a second cutter bar carrying member, means providing a guided movement for said two last mentioned members toward and away from the backing plate and means movable with the second cutter bar and adjustable with respect thereto for depressing said presserfoot plate in the movement of the second cutter bar toward the first mentioned one.

41. In a machine of the kind described, a presserfoot bar arranged in a perpendicular plane and having a longitudinally extending rib on one side between its top and bottom edges, a die plate fixed to the backing plate above said rib, a cutter bar fixed to the bottom edge of the backing plate and coacting with said rib to form a recess in said plate, a presserfoot plate arranged in said recess, brackets fixed to the other side of said plate, guide rods fixed to the presserfoot plate and having a sliding bearing engagement in said backing plate and brackets respectively, means for urging said presserfoot plate outwardly of said bracket and means adjustable on said guide rods for determining the normal position of said presserfoot plate in said recess.

WILLIAM E. BECK.